Figure 1:
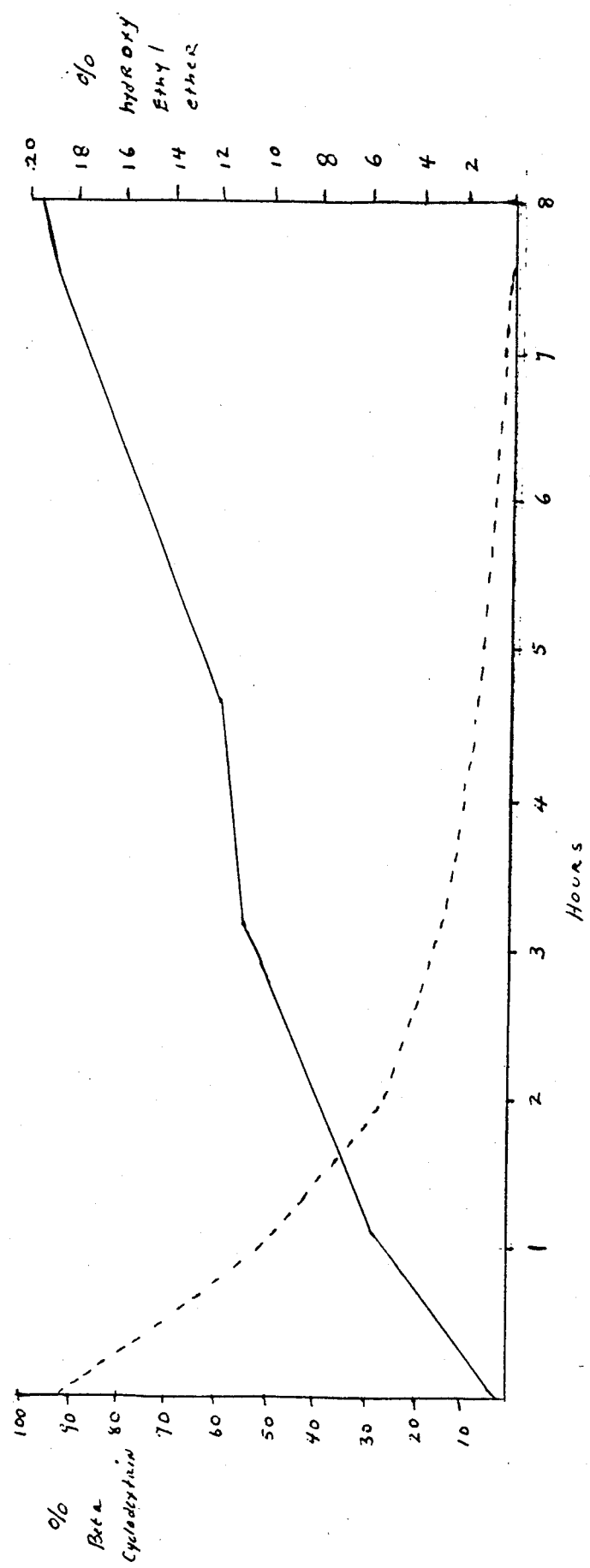

United States Patent [19]

Friedman

[11] Patent Number: 4,920,214

[45] Date of Patent: Apr. 24, 1990

[54] PROCESS FOR PRODUCING MODIFIED CYCLODEXTRINS

[75] Inventor: Robert B. Friedman, Chicago, Ill.

[73] Assignee: American Maize-Products Company, Stamford, Conn.

[21] Appl. No.: 852,630

[22] Filed: Apr. 16, 1986

[51] Int. Cl.$^5$ .................................................. A61K 1/00
[52] U.S. Cl. .................................. 536/103; 536/112; 536/120; 536/124
[58] Field of Search ................ 536/112, 103, 120, 124

[56] References Cited

U.S. PATENT DOCUMENTS

| | | | |
|---|---|---|---|
| 2,448,767 | 9/1948 | Carlson | 260/284 |
| 2,767,171 | 10/1956 | Opie | 536/102 |
| 2,819,260 | 1/1958 | Monson et al. | 260/209 |
| 3,453,259 | 7/1969 | Parmerter et al. | 536/112 |
| 3,459,731 | 8/1969 | Gramera et al. | 536/102 |
| 4,474,951 | 10/1984 | Pope | 536/95 |
| 4,582,900 | 4/1986 | Brandt et al. | 536/103 |

FOREIGN PATENT DOCUMENTS

| | | | |
|---|---|---|---|
| WO8502767 | 7/1985 | PCT Int'l Appl. | 536/112 |
| 1058401 | 8/1963 | United Kingdom | 536/103 |
| 2067090 | 7/1981 | United Kingdom | 536/103 |

OTHER PUBLICATIONS

Grobelny, D., "A New Method of Synthesis of Beta-Haloethylbenzyl Ethers", *Tetrahedron Letters*, No. 28, 1979, p. 2639.

Ullmanns Encyklopaedie der technischen Chemie, 9th Ed., Munchen, Urban & Schwarzenberg, 1957, p. 777.

Pitha, J. and Pitha, J., "Amorphous Water-Soluble Derivatives of Cyclodextrins: Nontoxic Dissolution Enhancing Excipients", *J. of Pharmaceutical Sci.*, vol. 74, No. 9, Sep. 1985, pp. 987–990.

Muller, B. and Brauns, U., "Solubilization of Drugs by Modified Beta-Cyclodextrins", *Int. J. of Pharmaceutics*, 26 (1985), pp. 77–88.

Texaco Chemical Co., *Ethylene Carbonate Propylene Carbonate*.

Srivastava, H. et al., "Studies on )-(2-Hydroxyethyl) Ethers of Carbohydrates: Part II–Hydroxyethylation of Carbohydrates with Ethylene Carbonate" *Indian J. of Chemistry*, vol. 9, Oct. 1971, pp. 1081–1082.

*Primary Examiner*—Johnnie R. Brown
*Assistant Examiner*—Elli Peselel
*Attorney, Agent, or Firm*—Lucas & Just

[57] ABSTRACT

The present invention is directed to a process for modifying and increasing the water solubility of cyclodextrins in a moderate controlled progressive reaction and in particular to producing derivatives of cyclodextrins in a substantially anhydrous reaction with an alkylene carbonate such as ethylene carbonate in an alkaline environment.

18 Claims, 1 Drawing Sheet

PROCESS FOR PRODUCING MODIFIED CYCLODEXTRINS

The present invention is directed to a process for modifying and increasing the water solubility of cyclodextrins in a moderate controlled progressive reaction and in particular to producing derivatives of cyclodextrins in a substantially anhydrous reaction with an alkylene carbonate such as ethylene carbonate in an alkaline environment.

Cyclodextrins also called "Schardinger dextrins" are known to be cyclic oligosaccharides composed of glucose residues bonded together by alpha 1,4 bonds. The six membered ring structure is called alpha-cyclodextrin, the seven membered ring is beta-cyclodextrin and the eight membered ring is gamma-cyclodextrin. The cyclodextrins have different chemical and physical properties from the linear oligosaccharides derived from starch in that they are non-reducing dextrins and the ring structure is widely used as a host for the inclusion of various compounds usually organic compounds for the food, pharmaceutical and chemical fields.

As is also well-known, cyclodextrins are produced from starch of any selected plant variety such as corn, potato, waxy maize and the like which may be modified or unmodified starch derived from cereal or tuber origin and the amylose or amylopectin fractions thereof. The selected starch in aqueous slurry at selected concentration up to about 35% by weight solids is usually liquefied as by gelatinization or treatment with a liquefying enzyme such as bacterial alpha-amylase enzyme and then subject to treatment with a transglycosylase (CGT) enzyme to form the cyclodextrins.

The amount of the individual alpha, beta and gamma-cyclodextrins produced by treating the starch with the CGT enzyme will vary depending on the selected starch, selected CGT enzyme and processing conditions. The parameters to select for the CGT enzyme conversion for the desired result in the amount of each individual cyclodextrin to be produced is conventional and well-described in the literature.

Conventionally, the DE of the liquefied starch is maintained below about 20 DE, the starch solids concentration is below about 35% by weight, the pH for conversion may be about 4.5 to 8.5 at a selected temperature from ambient and up to about 75° C. for a selected period of time typically from about 10 hours up to seven days and more. The amount of CGT enzyme used for conversion is conventional and well-known in the art.

Precipitation and separation of the individual cyclodextrins described in the prior art include solvent systems (D. French et al. J. Am. Chem. Soc. 71, 353 (1949)), inclusion compounds such as trichloroethylene (U.S. Pat. No. 3,425,910) as well as non-solvent systems utilizing selected ion exchange resins and chromatographic gel filtration (U.S. Pats. No. 4,418,144 and 4,303,787). The individual cyclodextrins and mixtures thereof are readily available in the market.

Beta-cyclodextrin is most widely used to form inclusion complexes particularly in the pharmaceutical field. The six membered ring alpha-cyclodextrin has a cavity size of about 5 to 6 Å which is too small to take up most of the commonly used pharmaceuticals, whereas the beta-cyclodextrin cavity measures about 7 to 8 Å which accommodates most pharmaceuticals as does the gamma-cyclodextrin cavity of about 9 to 10 Å. Additionally, by making beta-cyclodextrin more soluble, it is highly economically attractive. The beta-cyclodextrin tends to form stable complexes with many pharmaceuticals but it is frequently very difficult to use because of its low water solubility. Only about 1.8 grams of beta-cyclodextrin will dissolve in 100 mls. of water as compared to the about 14 grams of alpha-cyclodextrin and about 23 grams of gamma-cyclodextrin that dissolve in 100 mls. of water at room temperature.

It has now been discovered that water solubility of the cyclodextrins may be drastically increased by modification with alkylene carbonates and preferably ethylene carbonate to form hydroxyethyl ethers on the ring structure. In a preferred embodiment of the present invention, the water solubility of the beta-cyclodextrin was increased up to about 60 grams in 100 mls. of water without necessarily interfering with its capacity to form inclusion complexes. In fact, water solubility has been measured at greater than 60 grams in 100 mls. of water at room temperature. Another advantage of the present invention is that the modification to hydroxyethyl ethers is carried out in a moderate progressive reaction under readily controlled conditions and it may be stopped to obtain the desired degree of modification in a predictable manner.

In accordance with the present invention, the modification with the alkylene carbonate is carried out in a substantially anhydrous system in an alkaline environment which is of advantage in that the reaction is carried out with the reagent as reaction medium. The alkylene oxides have been used heretofore for modifying starch and the reducing sugars of starch hydrolysates and long chain oligosaccharides but the known processes involve either an aqueous system wherein water interferes with etherification of the sugars or a non-aqueous system wherein a complicated multistage procedure is used which makes it virtually impossible to control the reaction for predictable results. This is especially true of the highly aggressive alkylene oxide reagents such as ethylene and propylene oxides which require special precautions to avoid the danger of explosion and the serious hazard to health because of toxicity. The alkylene carbonates of the present invention are non-toxic as are the resulting cyclodextrin hydroxyethyl ethers and there is no need for any special precautions or controls during etherification since the reaction is a moderate one that is readily controlled in predictable manner to the desired degree of etherification.

In accordance with the present invention, it is only necessary to mix the selected cyclodextrin and alkylene carbonate in a basic environment and heat the mixture to initiate the moderate etherification reaction that progressively proceeds in the formation of the cyclodextrin hydroxyether. The reaction mixture is then held at the elevated temperature for a period of time to allow the reaction to progressively proceed. Preferably, the dry, selected cyclodextrin is mixed with a dry basic catalyst and a liquefied alkylene carbonate is added to form a homogeneous slurry prior to the addition of heat. The amount of water present in the substantially anhydrous reaction mixture is maintained below about 20% by weight of the ingredients and preferably below 15% by weight.

The substantially anhydrous reaction is carried out in an alkaline environment. In order to form the basic environment a basic catalyst is used. The basic catalyst is present in the reaction vessel in an amount sufficient to initiate the reaction. Initiation of the reaction is apparent by visually observing bubbles coming off of the reaction medium. It is preferred that the amount of basic catalyst present for the reaction of the present invention is about 2% to about 10% by weight based on the weight of the cyclodextrin present. Best results are achieved when reaction is carried out in the presence of a basic catalyst such as potassium carbonate in an amount of about 4 to 6% by weight based on the weight of cyclodextrin. Other catalysts that may be used to advantage include sodium hydroxide and triethylamine.

The amount of alkylene carbonate used for reaction may, of course, be varied but for best results an excess of the selected alkylene carbonate is used for the maximum degree of modification. Reaction is stopped by cooling the mix to ambient temperature when the desired degree of modification has been achieved. For best results in control of reaction and predictability, ethylene carbonate is used in an amount of from about 12 moles to about 40 moles for each mole of cyclodextrin in the reaction mixture. Any alkylene carbonate can be used. Preferably, reaction is carried out with just one selected alkylene carbonate but, if desired, a mixture of alkylene carbonates may be used in the reaction mixture. Suitable alkylene carbonate for the present invention include propylene carbonate, ethylene carbonate, butylene carbonate and glyceryl carbonate. The amount of aklylene carbonate used is about 12 moles to about 40 mols per mole cyclodextrin. Greater amounts of alkylene carbonate can be used without seriously effecting the reaction.

The preferred cyclodextrin is beta-cyclodextrin for use in the pharmaceutical and food fields. Preferably, reaction is carried out with just one selected cyclodextrin but, if desired, a mixture of cyclodextrins may be used in the reaction mixture.

The temperature of reaction may also be varied from about 100° C. up to about 200° C. and preferably it is between Further details and advantages of the present invention are most readily understood by reference to preferred embodiments herein chosen for illustration and to:

FIG. 1 which illustrates the controlled progressive modification of beta-cyclodextrin in accordance with the invention.

EXAMPLE I

In one preferred embodiment of the invention, 100 grams of beta-cyclodextrin were mixed with 6 grams of potassium carbonate. The dry powder mix was placed in a glass conventional three-necked flask fitted with a condenser. 250 grams of liquefied ethylene carbonate were added and mixed with the dry powder to form a homogeneous slurry. In this example the ethylene carbonate was liquefied by melting the solid ethylene carbonate. The cyclodextrin contained a small amount of about 10% of moisture present in the substantially anhydrous reaction mixture. The temperature was raised to 125° C. and held at 125° C. for 7 ½ hours whereupon all of the ingredients were in solution according to visual observation.

The reaction mass was allowed to cool to room temperature and about 1 liter of acetone was added and mixed vigorously with the solution to precipitate the hydroxyethyl ether non-toxic beta-cyclodextrin. The precipitate was removed from the reaction liquor by vacuum filtration and then redissolved in a minimal amount of methanol, reprecipitated by acetone and then filtered and dried. Dissolving the precipitate in methanol is effective for removing the acetone by distillation if this should be desired and the methanol solution may be treated with an ion exchange resin in conventional manner to remove residual catalyst salts and conventional carbon bleaching may also be used in conventional manner for decolorization. After a final precipitation with acetone, the non-toxic hydroxyethyl ether beta-cyclodextrin was a white powder which exhibited the high water solubility of 60 grams dissolved in 100 mls. of water.

The moderate progression of the controlled reaction is shown in FIG. 1. As there shown the modification of the beta-cyclodextrin quite unexpectedly progressed in a linear manner and at the end of 7 ½ hours there was no discernible unreacted beta-cyclodextrin left in the reaction liquor. The % of hydroxyethyl ether was at a maximum of about 19% at that point which is equal to a degree of substitution of about 0.7. The moderate progression in linear manner as a correlation of time and temperature and concentrations in the example provides excellent control whereby the reaction may be stopped at any desired point to obtain a desired degree of substitution in a predictable manner for the application use at hand where the control of water solubility of the inclusion complex is desirable.

EXAMPLE II

In this second embodiment of the invention, gamma-cyclodextrin is substituted for the beta-cyclodextrin in Example I using the same proportions of ingredients and reaction condition of Example I. The modification of the gamma-cyclodextrin to hydroxyethyl ether proceeds in a comparable linear predictable manner.

It will be understood that progression of the moderate reaction is a function of time and temperature for any given concentration of ingredients and that the progression of the modification may vary albeit the reaction will still progress in a controlled linear manner.

EXAMPLE III

Example I is repeated by substituting alpha-cyclodextrin for the beta-cyclodextrin using the same procedure and proportion of ingredients for controlled linear conversion to alpha hydroxyethyl ether cyclodextrin.

Acetone is preferred for recovery of the hydroxyethyl ether cyclodextrins since its boiling point is below that of the alkylene carbonates which may be readily recovered from the acetone by conventional distillation and recycled for the modification reaction. The alkylene carbonates are soluble in a wide range of organic solvents which provides flexibility in selection of a solvent system in which the cyclodextrin derivatives are insoluble. For example, N-propanol ethyl acetate, toluene and chloroform may be substituted for acetone if desired.

EXAMPLE IV

Example I is repeated by substituting propylene carbonate for the ethylene carbonate and heating to, and carrying out the reaction at 150° C; otherwise, the same procedure and proportion of ingredients for controlling linear conversion to beta-hydroxypropyl ether cyclodextrin. It is noted that propylene carbonate is a liquid and therefore did not need to be melted prior to addition.

The cyclodextrins of the present invention may be recovered after reaction in any convenient manner. Conventional freeze-drying may be employed, for example, precipitating the hydroxy ether cyclodextrin with a suitable precipitant such as acetone. Thereafter the precipitate is dissolved in water, preferably deionized and decolorized in conventional manner and then freeze dried.

It will be understood that it is intended to cover all changes and modifications of the preferred embodiments herein chosen for the purpose of illustration which do not constitute a departure from the spirit and scope of the invention.

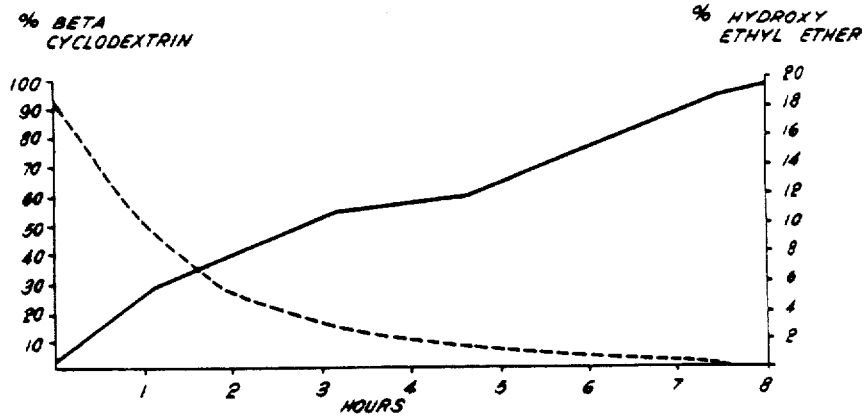

What is claimed is:

1. The process of modifying cyclodextrins to produce hydroxy ethers which comprises the steps of forming a substantially anhydrous mixture of one or more alpha, beta and gamma cyclodextrins and a selected alkylene carbonate in a basic environment in absence of a quaternary ammonium halide catalyst and heating the resulting mixture to a temperature of at least about 100° C. to initially produce visible bubbles coming off the mixture and to modify the one or more cyclodextrins and form an ether derivative.

2. The process of claim 1 in which beta-cyclodextrin is selected for reaction with the alkylene carbonate.

3. The process of claim 2 in which the alkylene carbonate is ethylene carbonate which reacts with the beta-cyclodextrin to form a hydroxyethyl ether modified beta-cyclodextrin.

4. The process of claim 1 in which about 12 moles to about 40 moles of alkylene carbonate is present in the reaction mixture for each mole of cyclodextrin.

5. The process of claim 1 in which a basic catalyst is added to make the basic environment.

6. The process of claim 1 in which the amount of water present in the substantially anhydrous reaction mixture is not over about 20% by weight of the dry solids therein.

7. The process of claim 2 in which the alkylene carbonate is propylene carbonate which reacts with the beta-cyclodextrin to form a hydroxyethyl ether modified beta-cyclodextrin.

8. The process of claim 3 in which the reaction is continued until the water solubility of the hydroxyethyl ether is greater than about 1.8 grams of the beta-cyclodextrin hydroxy ether in 100 mls. of water and up to about 60 grams in 100 mls. of water.

9. The process of claim 5 in which the basic catalyst is potassium carbonate.

10. The process of modifying beta-cyclodextrin to increase its water solubility which comprises the steps of mixing beta-cyclodextrin with an alkylene carbonate and a basic catalyst not a quaternary ammonium halide to form a substantially anhydrous reaction mixture; heating the anhydrous reaction mixture to a temperature of at least about 100° C. to initially produce visible bubbles coming off the reaction mixture and to modify the beta-cyclodextrin by forming an ether derivative of increased water solubility and recovering the modified beta-cyclodextrin ether derivative.

11. The process of claim 10 in which the alkylene carbonate is ethylene carbonate present in the reaction mixture in an amount of about 12 moles to about 40 moles for each mole of beta-cyclodextrin.

12. The process of claim 10 in which the alkylene carbonate is propylene carbonate present in the reaction mixture in an amount of about 12 moles to about 40 moles for each mole of beta-cyclodextrin.

13. The process of claim 11 in which the basic catalyst is potassium carbonate.

14. The process of claim 13 in which the modified beta-cyclodextrin is recovered by adding acetone to precipitate the beta-cyclodextrin product from the reaction mixture.

15. The process of claim 10 in which the reaction mixture is heated to a temperature of about 125° C. to provide a moderate progressive reaction that proceeds in linear manner with time.

16. The process of claim 15 in which the substantially anhydrous reaction mixture contains less than about 20% of water by weight of the dry solids therein.

17. The process of claim 14 in which the modified beta-cyclodextrin is removed from the acetone and the ethylene carbonate is recovered from the acetone for recycle.

18. The process of claim 14 in which the recovered beta-cyclodextrin product is redissolved in methanol and reprecipitated from the methanol solution by adding acetone thereto.

* * * * *

UNITED STATES PATENT AND TRADEMARK OFFICE
CERTIFICATE OF CORRECTION

PATENT NO. : 4,920,214

DATED : April 24, 1990

INVENTOR(S) : Robert B. Friedman

It is certified that error appears in the above-identified patent and that said Letters Patent is hereby corrected as shown below:

Column 3, line 37, after the word "between", insert --about 100° to 150°C.--

The title page should be deleted to appear as per attached title page.

Figure 1 should be deleted to appear as shown below.

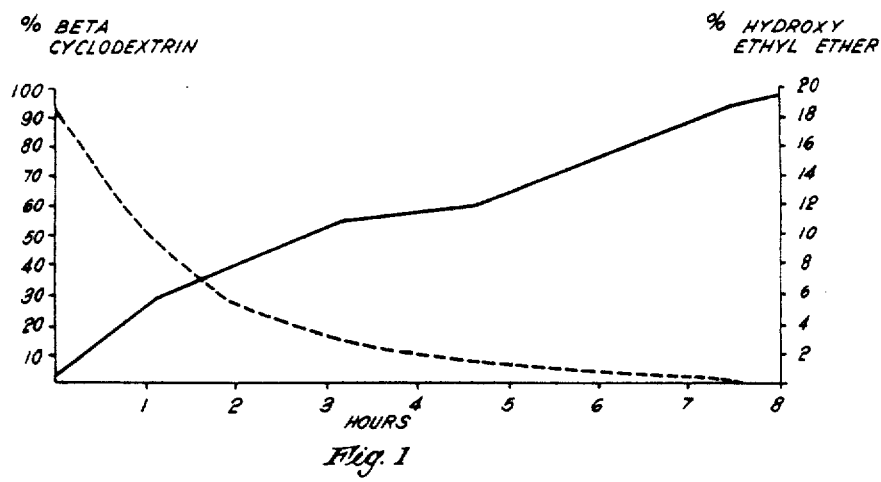

Fig. 1

Signed and Sealed this

Fifteenth Day of October, 1991

Attest:

Attesting Officer

HARRY F. MANBECK, JR.

Commissioner of Patents and Trademarks

United States Patent [19]

Friedman

[11] Patent Number: 4,920,214
[45] Date of Patent: Apr. 24, 1990

[54] PROCESS FOR PRODUCING MODIFIED CYCLODEXTRINS

[75] Inventor: Robert B. Friedman, Chicago, Ill.

[73] Assignee: American Maize-Products Company, Stamford, Conn.

[21] Appl. No.: 852,630

[22] Filed: Apr. 16, 1986

[51] Int. Cl.$^5$ .............................................. A61K 1/00
[52] U.S. Cl. ................................. 536/103; 536/112; 536/120; 536/124
[58] Field of Search ............... 536/112, 103, 120, 124

[56] References Cited

U.S. PATENT DOCUMENTS

| 2,448,767 | 9/1948 | Carlson | 260/284 |
|---|---|---|---|
| 2,767,171 | 10/1956 | Opie | 536/102 |
| 2,819,260 | 1/1958 | Monson et al. | 260/209 |
| 3,453,259 | 7/1969 | Parmerter et al. | 536/112 |
| 3,459,731 | 8/1969 | Gramera et al. | 536/102 |
| 4,474,951 | 10/1984 | Pope | 536/95 |
| 4,582,900 | 4/1986 | Brandt et al. | 536/103 |

FOREIGN PATENT DOCUMENTS

| WO8502767 | 7/1985 | PCT Int'l Appl. | 536/112 |
|---|---|---|---|
| 1058401 | 8/1963 | United Kingdom | 536/103 |
| 2067090 | 7/1981 | United Kingdom | 536/103 |

OTHER PUBLICATIONS

Grobelny, D., "A New Method of Synthesis of Beta-Haloethylbenzyl Ethers", *Tetrahedron Letters*, No. 28, 1979, p. 2639.

Ullmanns Encyklopaedie der technischen Chemie, 9th Ed., Munchen, Urban & Schwarzenberg, 1957, p. 777.

Pitha, J. and Pitha, J., "Amorphous Water-Soluble Derivatives of Cyclodextrins: Nontoxic Dissolution Enhancing Excipients", *J. of Pharmaceutical Sci.*, vol. 74, No. 9, Sep. 1985, pp. 987-990.

Muller, B. and Brauns, U., "Solubilization of Drugs by Modified Beta-Cyclodextrins", *Int. J. of Pharmaceutics*, 26 (1985), pp. 77-88.

Texaco Chemical Co., Ethylene Carbonate Propylene Carbonate.

Srivastava, H. et al., "Studies on )-(2-Hydroxyethyl) Ethers of Carbohydrates: Part II-Hydroxyethylation of Carbohydrates with Ethylene Carbonate" *Indian J. of Chemistry*, vol. 9, Oct. 1971, pp. 1081-1082.

Primary Examiner—Johnnie R. Brown
Assistant Examiner—Elli Peselel
Attorney, Agent, or Firm—Lucas & Just

[57] ABSTRACT

The present invention is directed to a process for modifying and increasing the water solubility of cyclodextrins in a moderate controlled progressive reaction and in particular to producing derivatives of cyclodextrins in a substantially anhydrous reaction with an alkylene carbonate such as ethylene carbonate in an alkaline environment.

18 Claims, 1 Drawing Sheet